April 22, 1924.   R. C. PEGRIM   1,491,309
PLANTER
Filed Oct. 2, 1922   3 Sheets-Sheet 3
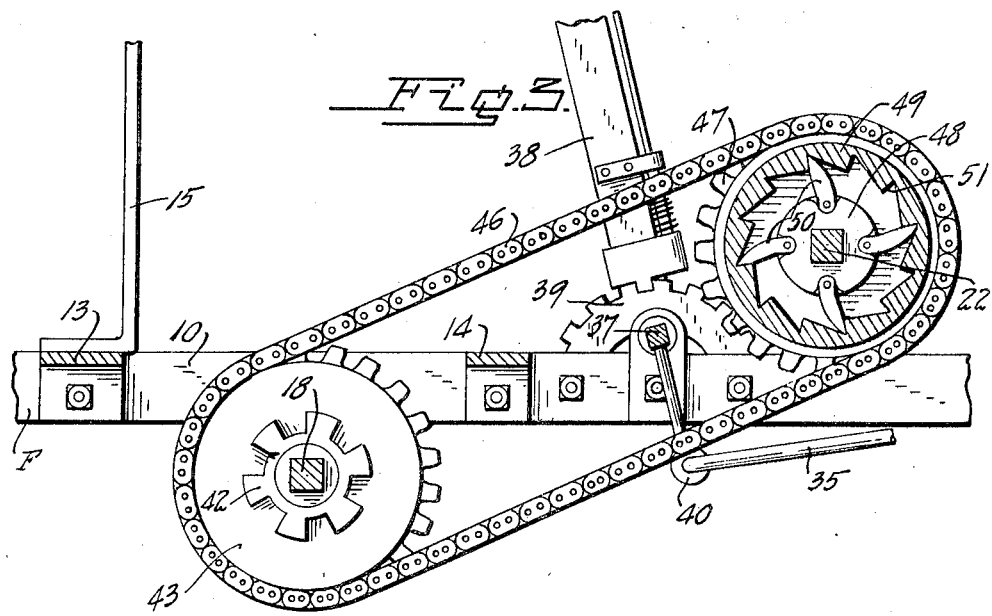
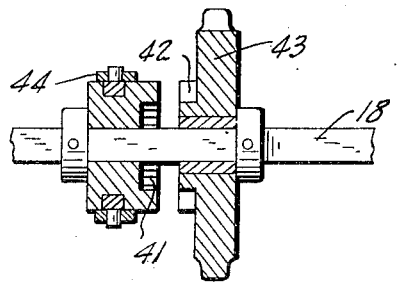
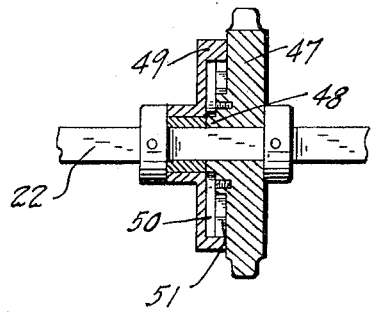
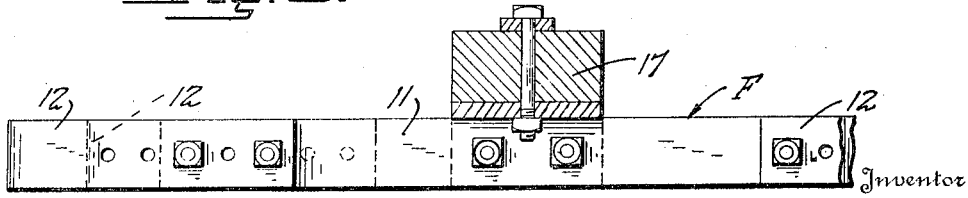
Inventor
R.C. Pegrim
By Watson E. Coleman
Attorney Patented Apr. 22, 1924.

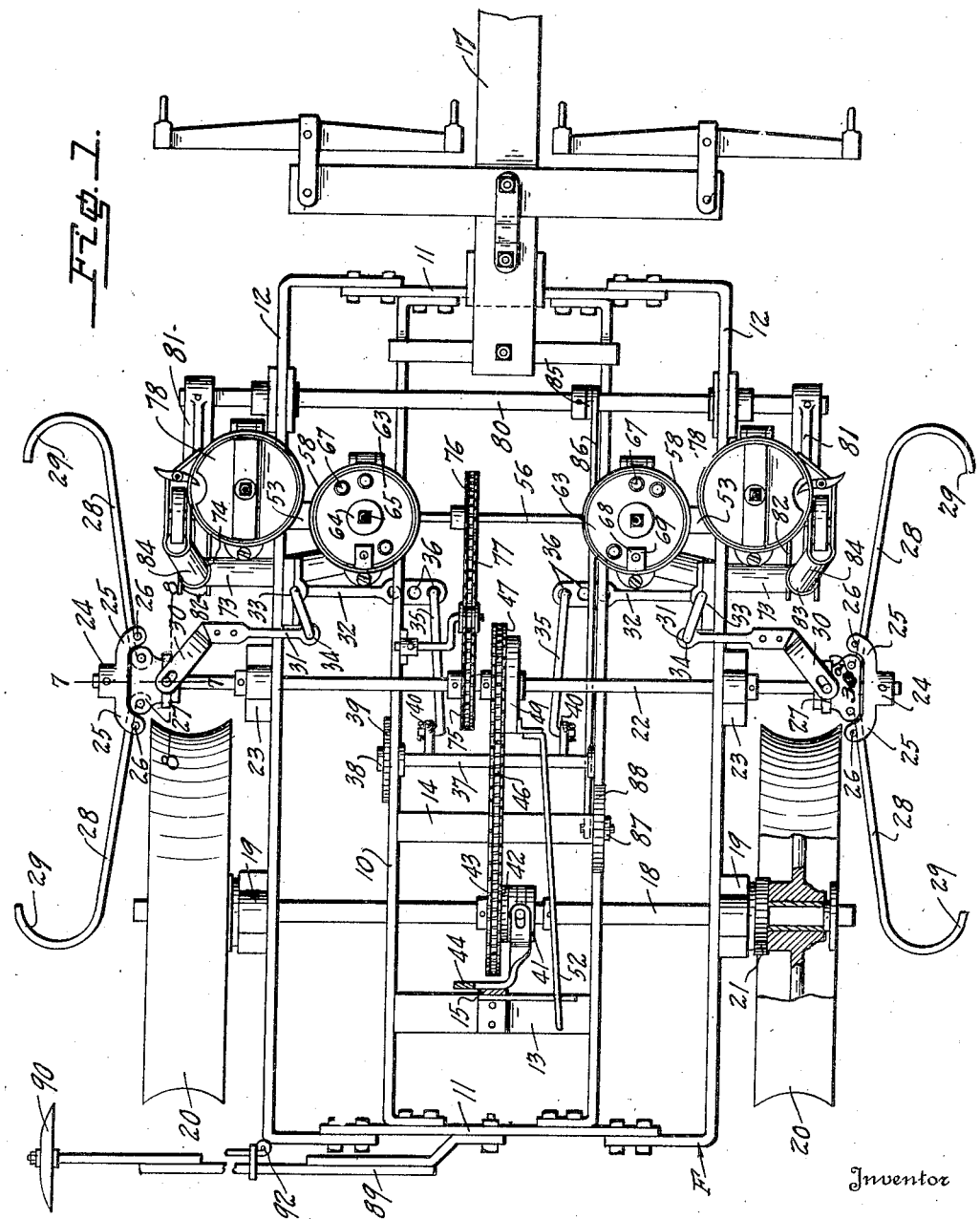

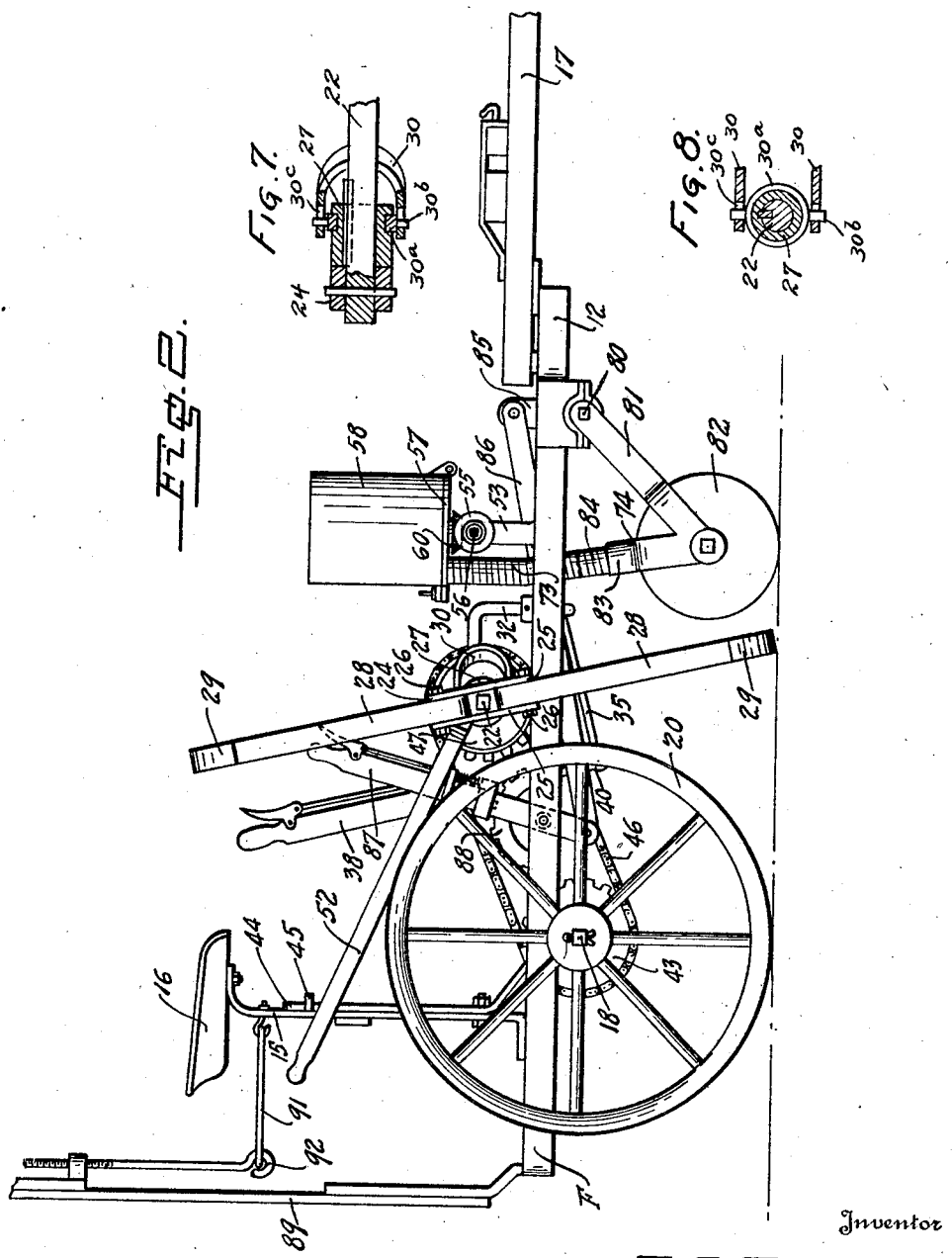

1,491,309

UNITED STATES PATENT OFFICE.

RAYMOND C. PEGRIM, OF NASHVILLE, TENNESSEE, ASSIGNOR OF ONE-SIXTH TO STERLING FORT, ONE-SIXTH TO ROBERT S. RUDOLPH, AND ONE-SIXTH TO HOWARD D. PETTUS, ALL OF CLARKSVILLE, TENNESSEE.

PLANTER.

Application filed October 2, 1922. Serial No. 591,843.

*To all whom it may concern:*

Be it known that I, RAYMOND C. PEGRIM, a citizen of the United States, residing at Nashville, in the county of Davidson and State of Tennessee, have invented certain new and useful Improvements in Planters, of which the following is a specification, reference being had to the accompanying drawings.

This invention relates to improvements in planters, and more particularly to planters of the type generally designated as check row planters.

An important object of the invention is to provide a device of this character in which the checking mechanism does not depend for its operation upon the usual check wire stretched across the field in which the planting is to be done, thereby eliminating the loss of time commonly met with in shifting the checking wire to the next position.

A further object of the invention is to provide a device of this character wherein the checking mechanism is driven from the supporting wheels of the planter and wherein the checking mechanism is so arranged that it may be synchronized or shifted with relation to the wheels from which it is driven so that the checking mechanism may be synchronized with the checking of a previous row or rows which has been planted.

A still further object of the invention is to provide checking mechanism of this character, in combination with planting and fertilizer distributor mechanism, the construction being such that the synchronization of the checking mechanism likewise synchronizes the planter so that the rows may be accurately checked as to actual planting.

Another object of the invention is to provide a device of this character wherein the structure is such that the planter may be readily adjusted to permit its use with wide planting or close planting as may be desired, the frame of the planter being adjustable as to transverse width to permit such adjustment.

An additional object of the invention is to provide a structure of this character wherein the operation and control of the checking and planting mechanism is simplified and rendered stronger and more durable.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a plan view of a planter constructed in accordance with my invention;

Figure 2 is a side elevation thereof, parts being broken away;

Figure 3 is an enlarged detail view showing the driving connection between the drive axle and checker shaft;

Figure 4 is a transverse sectional view of the clutch of the drive axle;

Figure 5 is a sectional view through the ratchet sprocket of the checker shaft;

Figure 6 is a fragmentary front elevation of a portion of the frame showing the manner of adjusting the frame;

Figure 7 is a detailed section on substantially the line 7—7 of Figure 1.

Figure 8 is a detailed section on the line 8—8 of Figure 1.

Referring now more particularly to the drawings, the numeral 10 indicates the main frame embodying front and rear cross pieces 11 extending beyond the sides thereof and to which are secured auxiliary frame members 12 employed for widening the main frame and which are adjustably connected to the cross members 11 so that the operative width of the frame F as a whole may be altered as desired. The main frame 10 is provided adjacent the rear end thereof with spaced cross braces 13 and 14, from the rearmost of which extends upwardly a suitable seat support 15 bearing the driver's seat 16. The frame has attached thereto forwardly the usual draft gear 17 by means of which it may be drawn rearwardly and approximately beneath the driver's seat. A shaft 18 extends transversely of the frame F and has its end portions extended through bearings 19 carried by the adjustable side members 12. Upon the ends of the shaft 18 without the adjustable side members 12 are mounted supporting wheels 20, these wheels being rotatable with relation to the shaft 18 and having connection with the shaft 18 through medium of ratchets 21 so arranged that upon forward motion of the machine the shaft 18 is driven.

Extending transversely of the frame F forwardly of the shaft 18 and forwardly of the forward edge of the supporting wheels 20, is a checker shaft 22 which is rotatably mounted in bearings 23 carried by the adjustable frame members 12. The ends of this shaft project beyond the outer faces of the wheels 20 and have mounted thereon but held against rotation with relation thereto, yokes 24. These yokes each embody a pair of oppositely extending wings 25, each wing being provided with spaced guiding elements 26. Slidably mounted upon the shaft 22 inwardly of the yokes 24 are adjusting members 27, at the opposite sides of which are pivoted the inner ends of marker arms 28, the outer ends of which are preferably hooked, as at 29. These arms, or the inner end portions thereof, extend through the guides 26 and accordingly may have their free ends moved toward or away from one another by movement of the adjusting member 27 upon the shaft 22. Each adjusting member 27 has formed therein a groove in which is located a ring 30$^a$ from which project pins 30$^b$ engaged within slots 30$^c$ in a shifting fork 30 of any desired construction carried by the outer ends of shifter arms 31 which extend transversely of the frame F. It will be seen that upon movement of the shifter arms 31 toward or away from the center of the frame F, the checker arms 28 will have the hooked end portions 29 thereof moved toward or away from one another, dependent upon the direction of movement of the shifter arms.

Shifting mechanism for the arms 31 is provided consisting in bell crank levers 32 having the arms thereof offset from one another to provide vertical portions which are rotatably mounted in bearings 33 carried by the adjustable side members 12 of the frame F. One arm of each of these levers is pivotally connected, as at 34, to the inner end of its corresponding shifter arm 31. The opposite arms of the levers 32 extend transversely of the frame F and are adapted for adjustable pivotal connection with the forward ends of links 35, the adjustment being accomplished by forming in the arms a plurality of openings 36 in which the end of the link is engageable. Extending transversely of the main frame 10 and rotatably mounted therein is a rock shaft 37 having secured thereto a lever 38 co-acting with a ratchet segment 39 secured to the frame so that the rock shaft may be held in adjusted position. This shaft is provided with short, downwardly extending arms 40 to which the rear ends of the links 35 are pivotally connected. It will be seen that upon rotation of the shaft 37 through medium of the lever 38, the bell cranks 32 will be operated, causing the shifter arms 31 to be shifted toward or away from the center of the frame F with the result hereinbefore described.

Secured to the shaft 18 intermediate the side members of the main frame 10 is one member 41 of a clutch, the opposite member 42 of which is carried by a sprocket wheel 43 rotatably mounted upon the shaft 18. The sections of the clutch may be shifted into and out of engagement with one another through medium of a shifting fork and arm assembly 44, the arm coacting with a segment 45 carried by the seat support 15 so that it may be located with the sections of the clutch held in their engaged or disengaged position. The sprocket wheel 43 is connected through medium of a chain 46 with a sprocket wheel 47 secured to the checker shaft 22. Likewise secured to the shaft 22 is the inner section 48 of a ratchet mechanism 49, this inner section bearing dogs 50 coacting with ratchet teeth 51 formed upon the outer member of the ratchet 49. The inner member 48 of the ratchet 49 is preferably carried by and forms a portion of the hub of the gears 47, as more clearly shown in Figure 3. The teeth 51 and dogs 50 are so arranged that during driving of the shaft by the chain 46, which occurs only during those periods when the clutch 41, 42 is engaged and the planter is moving forwardly, the outer member of the ratchet 49 remains stationary. To this outer member is secured a suitable operating handle 52 by means of which the outer member may be shifted.

It will be seen that during forward movement of the machine when the clutch sections are engaged the shaft 22 is rotated, having the same direction of rotation as the wheels 20. The rotation of this shaft causes rotation of the checker arms 28 and these arms being adjusted through medium of lever 38 and its connections to the adjusting member 27 so that they will come into contact with the ground at each engagement of an arm 28 with the ground, a mark will be formed upon the ground indicating a planting. Where a row, or rows, has been planted, alignment of the checking mechanism may be had by placing the planter in position to start the next row or rows, disengaging the sections 41, 42 of the clutch and operating the ratchet mechanism until a checker arm 28 comes into engagement with the ground to mark the same, the planter being stopped with these checker arms in alignment with check marks previously made by the arm. It will be noted that with the clutch sections 41, 42 disengaged, there is no resistance afforded to operation of the shaft 22 through medium of the ratchet member 49.

Secured to and extending upwardly from the adjustable side frames 12 forwardly of the shaft 22 are brackets 53 through which passes a shaft 56 carrying bevel gears 55 slidable upon the shaft but held against rotation with relation thereto by any suitable means. Mounted upon the upper surfaces of the brackets 53 are the bases 57 of grain hoppers 58. Since these hoppers are identical in construction, but one thereof will be herein described. The base 57 has rotatably mounted therein the hub of a beveled gear 60 meshing with the gear 55 mounted in the bracket 53 for driving a valve plate 63 rotating upon the base plate 57. Mounted within each hopper is a washer plate 64 abutting the upper surface of the valve plate 63 and secured to the gear 60 by means of a bolt 65 passing through the gear and washer plate so that the gear 60 is rotatably supported from the upper surface of the valve plate 63 and drives the same by its rotation. The base 57 has an outlet opening and the valve plate is formed with an opening or openings 67 in which seed deposited in the hopper 58 may be collected to pass from the hopper through the opening of the base when the openings 67 are aligned therewith. Beneath the bottom of each hopper is a seed conduit 73 receiving seed from the hopper and conducting it to the seed boot 74. The shaft 56 is driven through a sprocket wheel 75 secured to the shaft 22 and connected with a sprocket wheel 76 secured to the shaft 56 by a chain 77, these sprockets and the chain being located within the main frame 10. If desired, a fertilizer distributor may be provided upon the frame, as indicated at 78, such mechanism if it be provided being carried by the adjustable side frames 12 and driven from the shaft 56 as illustrated, the driving mechanism for the distributor being shiftable upon the shaft 56 when the side frames 12 are moved for the purpose of adjustment.

Mounted in bearings carried by the adjustable side frames 12 forwardly of the shaft 56 is a shaft 80 having its ends extending beyond the adjustable side frames 12 and having adjustably secured thereto drill arms 81, the lower ends of which are provided with furrow opening disks 82. The lower ends of the arms 81 are in the form of a seed boot arranged between the disks 82 carried thereby and provided at its upper end with a forked inlet 83 connected with the outlet conduit 73 from the seeding mechanism and the outlet conduit 84 of the fertilizer distributor 78 respectively, it being, of course, understood that an arm 81 is provided at each side of the machine. These arms will align with the wheels 20 which serve as packers and furrow closers in addition to the usual function of supporting the planter. The shaft 80 has secured thereto an angle arm 85 which is connected by means of a link 86 with a lever 87 arranged adjacent the driver's seat and coacting with a segment 88 so that the depth of engagement of the furrow opening disks 82 may be regulated or these disks entirely withdrawn from the ground if so desired.

From the construction as hereinbefore described, it will be obvious that upon adjustment of the adjustable side frames 12 inwardly to narrow the width of the planter with respect to the width shown in Figure 1, the planter hoppers, fertilizer hoppers and control member 27 will all be moved inwardly simultaneously with the movement of the side members, it being merely necessary to make separate adjustment of the arms 81, yokes 24 and wheels 20 together with the shifting of the links 35 to the proper opening 36 of the bell crank levers 32. Attention is directed to the fact that in operation, the dropping by the seeder will be at all times synchronized with the checker arms 28 and that accordingly the operation synchronizing these checker arms or aligning the same so that they will engage the ground in alignment with a previously checked row will automatically synchronize the seed dropping without further adjustment. The checker mechanism and seed dropping mechanism may be readily disconnected by simply disengaging the sections 41, 42 of the clutch carried by the shaft 18. At the rear of the frame F and preferably at the center portion thereof, I pivot an arm 89 at one end, the opposite end of the arm being provided with a marker disk 90. This arm is adjustable as to length and is arranged so as to mark not a row planted but the middle line between two rows. When not in use this marker is held in upright position by means of a link 91 pivoted to the seat bracket 15 and having at its end a hook engaging an eye 92 carried by the arm 89. The operation of this marker is believed to be obvious to all those familiar with the art. From the foregoing it is believed to be obvious that a planter constructed in accordance with my invention eliminates the use of check wires for checking mechanism and provides a checking mechanism which may be readily adjusted to align the same with previously checked rows. It will furthermore be obvious that the construction hereinbefore set forth provides a device which may be readily adjusted as to width in addition to the other obvious changes thereof, thereby permitting regulation of the space between the rows without the expenditure of a large amount of labor, as is ordinarily required. It will furthermore be obvious that this construction is capable of some change and modification without materially departing from the spirit of my invention and I accordingly do not limit myself to such specific structure except as hereinafter claimed.

I claim:—

1. In a checking mechanism for planters, a rotatable shaft, a yoke carried thereby, spaced guides carried by the yoke, a member slidable upon the shaft, arms directed through said guides and pivotally connected with the member slidable upon the shaft, and means for shifting said slidable member to increase or decrease the radius of the arc of movement of the free ends of said arms.

2. In a planter and in combination with the usual planter frame and supporting wheels therefor, a shaft rotatably mounted upon the frame, a driving connection between the shaft and supporting wheels, yokes carried by the ends of said shaft and embodying pairs of spaced guides, arms directed through said guides, adjusting elements slidably mounted upon the shaft adjacent said yokes and to which the inner ends of the arms are pivotally connected, a second shaft rockably mounted upon the frame, a lever control for rocking said second named shaft, and an operative connection between the last named shaft and said adjusting members whereby said adjusting members are shifted toward and away from said yokes upon rocking the last named shaft.

3. In a planter and in combination with the usual planter frame and supporting wheels therefor, a shaft rotatably mounted upon the frame, a driving connection between the shaft and supporting wheels, yokes carried by the ends of said shaft and embodying pairs of spaced guides, arms directed through said guides, adjusting elements slidably mounted upon the shaft adjacent said yokes and to which the inner ends of the arms are pivotally connected, a second shaft rockably mounted upon the frame, a lever control for rocking said second named shaft, an operative connection between the last named shaft and said adjusting members whereby said adjusting members are shifted toward and away from said yokes upon rocking the last named shaft, including bell crank levers each having one arm connected with the adjacent adjusting member and the other arm thereof provided with a link connection with said last named shaft.

4. In a planter and in combination with the usual planter frame and supporting wheels therefor, a shaft rotatably mounted upon the frame, a driving connection between the shaft and supporting wheels, yokes carried by the ends of said shaft and embodying pairs of spaced guides, arms directed through said guides, adjusting elements slidably mounted upon the shaft adjacent said yokes and to which the inner ends of the arms are pivotally connected, a second shaft rockably mounted upon the frame, a lever control for rocking said second named shaft, an operative connection between the last named shaft and said adjusting members whereby said adjusting members are shifted toward and away from said yokes upon rocking the last named shaft, including bell crank levers pivotally mounted at opposite sides of said frame and each having one arm connected with the adjacent adjusting member of the first named shaft, arms formed on the last named shaft, and a link connection between the other arms of the bell crank levers and the arms of the last named shaft.

5. In a planter and in combination with the usual planter frame and supporting wheels therefor, a shaft rotatably mounted upon the frame, a driving connection between the shaft and supporting wheels, yokes carried by the ends of said shaft and embodying pairs of spaced guides, arms directed through said guides, adjusting elements slidably mounted upon the shaft adjacent said yokes and to which the inner ends of the arms are pivotally connected, a second shaft rockably mounted upon the frame, a lever control for rocking said second named shaft, an operative connection between the last named shaft and said adjusting members whereby said adjusting members are shifted toward and away from said yokes upon rocking the last named shaft, including bell crank levers pivotally mounted at opposite sides of said frame and each having one arm connected with the adjacent adjusting member of the first named shaft, arms formed on the last named shaft, a link connection between the other arms of the bell crank levers and the arms of the last named shaft, said yokes being adjustable upon the first named shaft, means for adjusting the bearings of said bell crank levers toward and away from the center of the frame, and an adjustable connection between said links and the last named arms of the bell crank levers.

In testimony whereof I hereunto affix my signature.

RAYMOND C. PEGRIM.